Oct. 16, 1962 P. N. GRAHAM ET AL 3,058,352
VOLUMETRIC GLASSWARE AND METHOD OF PRODUCTION
Filed Jan. 29, 1958
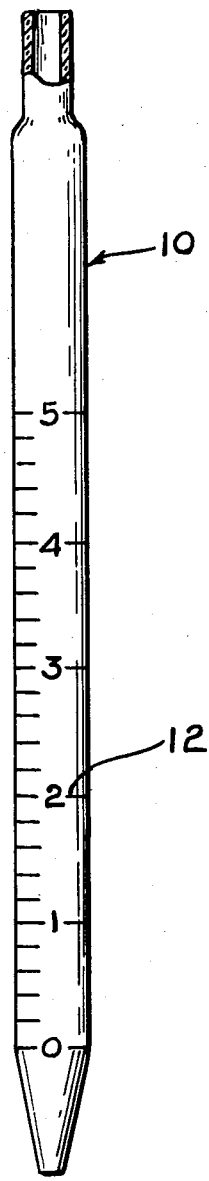
INVENTORS
PAUL N. GRAHAM
AND MARGARET B. KRAMPF
BY Clarence R. Patty, Jr.
ATTORNEY 3,058,352
VOLUMETRIC GLASSWARE AND METHOD OF PRODUCTION
Paul N. Graham and Margaret B. Krampf, Corning, N.Y., assignors to Corning Glass Works, Corning, N.Y., a corporation of New York
Filed Jan. 29, 1958, Ser. No. 711,969
10 Claims. (Cl. 73—427)

This invention relates to volumetric glassware having distinctive graduation markings, or volume indicia, that are resistant to chemical attack.

Volumetric glassware is used in handling measured amounts of liquids or solutions for laboratory, medical and pharmaceutical purposes, and includes such articles as pipettes, graduates, flasks, syringe barrels, bottles and the like. In order to meet the stringent requirements of such usage, articles of this type are customarily produced from transparent, heat-resistant, boro-silicate glasses that are relatively inert to chemical attack by either the materials handled or cleaning agents.

Volume markings, graduations, and other indicia on such articles must provide good contrast and sharp definition for quick, accurate reading. They must also be resistant to chemical attack by either acid or alkaline solutions as well as to mechanical abrasion or chipping. Furthermore the markings should not appreciably weaken the glassware.

Prior markings of this nature, formed on the glass by enameling or within the glass by etching or staining processes, have not been entirely satisfactory. Enamel markings, being raised from the glass surface, tend to become abraded or chipped in service. Etched markings avoid this problem, but are difficult to read unless filled with a colored ceramic. Such fillings present adhesion, expansion mismatch and chemical attack problems.

These difficulties are largely avoided with stained markings wherein selected areas of a glass surface are colored by a thermally induced ion exchange between copper or silver salts in a staining paste and alkali ions in the glass. Reduced copper ions produce the well known copper ruby color and silver ions a yellow or amber color in stained areas. The copper ruby stain type of marking has gained widespread favor because its distinctive color is attractive and facilitates rapid, accurate volume readings.

Conventional copper stained markings are, however, subject to alkaline attack, particularly by hot alkaline solutions, and fade rapidly under extreme conditions. This is a serious deficiency since hot alkaline solutions are frequently encountered both in use and in cleaning.

A primary purpose of the present invention is to provide an improved article of volumetric glassware in which this deficiency is substantially minimized.

A more specific purpose is to provide volumetric glass articles having stained markings with a red color and improved chemical durability.

A further purpose is to provide an improved method of producing stained markings on volumetric glassware.

The invention resides in an article of volumetric glassware having within its surface red colored indicia that are resistant to alkaline attack, said indicia comprising reduced copper and silver ions. It further resides in a method of producing such glass articles which comprises introducing a combination of copper and silver ions into portions of the glass surface, and reducing the copper ions to produce a red color.

The invention is described with reference to the accompanying drawing which shows a pipette produced in accordance with the invention.

Pipette 10 is formed in conventional manner from a boro-silicate glass. A suitable staining composition is applied to selected areas of the glass surface corresponding to markings 12. Partially coated pipette 10 is then positioned vertically in any suitable supporting means, such as a wire rack mounted above a sand tray, and heated in a kiln at a temperature below that at which the glass will warp or deform but above the glass annealing temperature. After cooling and cleaning, markings 12 remain in the coated areas of pipette 10.

In practicing the present invention staining compositions may be prepared and applied in accordance with conventional copper staining practices, including silk screening or spraying. Such practices are modified only to the extent of employing a combination of active staining compounds, as descirbed later, rather than a copper staining compound only and reference is made to the prior art, e.g., U.S. Patent #2,701,215 to W. H. Kroeck, for details of paste preparation, application and firing procedure not here described.

Silk screening is the preferred method of applying staining compositions to form accurately spaced markings on volumetric glassware. In producing a paste for this type of application, the active staining compounds are mixed with inert fillers such as $BaCO_3$, ochre, bentonite, etc., wet milled to a desired degree of fineness, dried and milled with an organic vehicle to produce a proper viscosity and homogeneity for application to the ware. This paste is then applied to the ware and dried.

Ware coated in this manner, such as pipette 10, is fired in accordance with schedules conventionally used in firing copper staining pastes. Thus pipette 10 may be introduced into a heated kiln for a time sufficient to effect exchange of copper and silver ions in the staining paste for alkali metal ions in the glass. Subsequently a reducing atmosphere is introduced for 30 minutes. A reducing atmosphere, composed of partially burned natural gas and containing substantial amounts of $H_2$ and CO, is then introduced and the kiln temperature dropped to 540° C. over a period of 45 minutes. Pipette 10, when removed and cleaned of paste residue has red markings 12 stained within its surface.

The earlier mentioned Kroeck patent teaches the advantages of using a sulfur dioxide atmosphere in copper staining. We have found that such an atmosphere, preferably produced by burning sulfur in the kiln during firing of the ware, also facilitates production of a deep, clear color in markings 12. That patent further teaches that a deep amber can be obtained from a combined silver and copper paste, but that no beneficial effect accures from reduction.

Our present invention is based on the discovery that a properly proportioned combination of silver and copper ions in the staining composition provides a distinct advantage upon reduction, namely a red colored marking having good durability to alkaline attack. It is further premised on the discovery that the presence of an appreciable amount of ferric oxide, or equivalent iron compound, in the composition markedly enhances both the color and durability of the markings produced. The method of obtaining this characteristic will be better illustrated by reference to the following table which shows the characteristics of stained markings produced by pastes providing varying copper to silver ratios as determined on an ionic or mole basis.

| Composition | Cu/Ag ratio | Stain color |
|---|---|---|
| 1 | All Cu | ruby red. |
| 2 | 25/1 | red. |
| 3 | 15/1 | red. |
| 4 | 12/1 | red. |
| 5 | 7/1 | red. |
| 6 | 5/1 | brownish red. |
| 7 | 3/1 | brown. |
| 8 | 1/1 | amber. |

Each of the indicated compositions was prepared by mixing 65 parts of black copper oxide and silver nitrate, properly proportioned to provide the indicated Cu/Ag ion ratio in the paste, with 14 parts of ferric oxide and 21 parts of filler. The mixture was then milled and mixed with a silk screen vehicle, as earlier described, to provide a paste capable of silk screen application. The pastes were then applied to a pipette, such as pipette 10 produced from the commercial borosilicate glass earlier mentioned. The glassware was then heated in a kiln in accordance with the earlier described heat treating schedules and atmospheres. This particular schedule is not critical and would necessarily be varied in known manner for other glasses.

Durability to alkaline attack was determined by a conventional test wherein a sample of stained glass is immersed in a boiling 5% solution of sodium hydroxide for six hours. Glass test pieces were stained with each of the eight compositions shown above and tested in this manner. With each composition except #1, the stain color was altered toward a brown or amber during the test but was still clear and distinct. By way of comparison the conventional copper ruby stain, composition 1 in the table, was reduced to pale yellow in three hours and almost completely removed in six hours.

While even small proportions of silver introduce a marked improvement in durability, stains produced from compositions having Cu/Ag ratios above about 25:1 are noticeably less durable than are lower ratio stains. On the other hand, the red color becomes undesirably brownish as the ratio is decreased to 5:1 and lower, and with a ratio of 1:1 only the characteristic silver amber is obtained. Accordingly, Cu:Ag ratios of 5:1 to 25:1 are employed for an attractive red and we obtain optimum durability and color with ratios of about 12 to 1.

The action of ferric oxide in the staining paste is not fully understood. In its absence however the resulting stains are less durable and tend toward an undesirable brownish appearance in much the same manner as when the silver content becomes too high.

What is claimed is:

1. An article of volumetric glassware having red colored indicia within its surface that are resistant to alkaline attack, said indicia comprising reduced copper and silver ions in a ratio of at least 5:1, the silver ions being present in an amount effective to impart a resistance to destructive attack from hot sodium hydroxide.

2. An article of volumetric glassware having red graduation markings formed within its exterior surface by staining, said graduation markings being composed of a combination of reduced copper and silver ions in a ratio of at least 5:1, the silver ions being present in an amount effective to impart a resistance to destructive attack from hot sodium hydroxide.

3. An article in accordance with claim 2 in which the markings additionally contain iron ions.

4. An article of volumetric glassware composed of an uncolored borosilicate glass having selected areas of its exterior surface colored red with a combination of reduced copper and silver ions in a ratio of at least 5:1, the silver ions being present in an amount effective to impart a resistance to destructive attack from hot sodium hydroxide.

5. A method of producing an article of volumetric glassware having indicia formed within its surface which comprises introducing a combination of copper and silver ions into selected portions of the glass surface and reducing the copper ions to produce a red color, the ratio of copper ions to silver ions being at least 5:1 and the silver ions being present in an amount effective to impart a resistance to destructive attack from hot sodium hydroxide.

6. A method of producing an article of volumetric glassware which includes the steps of applying to selected areas of the article surface a copper staining paste containing a silver compound, heating the article at a temperature above the annealing temperature of the glass to introduce a mixture of copper and silver ions into the selected areas of the glass surface and thereafter heating the glass in a reducing atmosphere to reduce the copper ions in the glass, the ratio of copper ions to silver ions being at least 5:1 and the silver ions being present in an amount effective to impart a resistance to destructive attack from hot sodium hydroxide.

7. A method in accordance with claim 5 wherein the ratio of copper to silver in the staining paste is between 5 to 1 and 25 to 1.

8. A method in accordance with claim 5 wherein the ratio of copper to silver in the staining paste is on the order of 12 to 1.

9. A method in accordance with claim 5 wherein the copper staining paste further contains ferric oxide.

10. An article of transparent volumetric glassware having stain-type indicia composed of copper and silver ions incorporated within the glass surface from staining material containing such metal ions in a ratio of between 5 and 25 copper ions to 1 silver ion, said indicia being characterized by a highly perceptive red color and a resistance to destructive attacks from hot sodium hydroxide.

References Cited in the file of this patent
UNITED STATES PATENTS

| | | |
|---|---|---|
| 2,662,035 | Levi | Dec. 8, 1953 |
| 2,699,670 | Becton | Jan. 18, 1955 |
| 2,707,688 | Blackman | May 3, 1955 |
| 2,811,040 | Blackman et al. | Oct. 29, 1957 |